United States Patent
Meulenbrugge et al.

(10) Patent No.: US 6,222,901 B1
(45) Date of Patent: Apr. 24, 2001

(54) X-RAY EXAMINATION APPARATUS INCLUDING AN IMAGE SENSOR MATRIX WITH A CORRECTION UNIT

(75) Inventors: Hendrik J. Meulenbrugge; Peter L. Alving; Johannes A. Luijendijk; Johannes J. Stouten, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/488,722

(22) Filed: Mar. 12, 1999

Related U.S. Application Data

(63) Continuation of application No. 08/762,894, filed on Dec. 10, 1996, now Pat. No. 6,028,913.

(30) Foreign Application Priority Data

Dec. 18, 1995 (EP) .................................................. 95203532

(51) Int. Cl.$^7$ ...................................................... H05G 1/60
(52) U.S. Cl. ............................................. 378/19; 378/98.8
(58) Field of Search ........................................ 378/19, 98.8

(56) References Cited

U.S. PATENT DOCUMENTS 4,965,726 * 10/1990 Heuscher et al. ....................... 378/19
5,331,682 * 7/1994 Hsieh ...................................... 378/19

* cited by examiner

Primary Examiner—Craig E. Church
(74) Attorney, Agent, or Firm—John F. Vodopia

(57) ABSTRACT

An X-ray examination apparatus utilizes an image sensor matrix for picking up an X-ray image, i.e. for converting incident X-rays into electric charges. The X-ray examination apparatus includes a control circuit for controlling the image sensor matrix so as to form a dark signal. The X-ray examination apparatus also includes a correction unit which is arranged to derive the electronic image signal from the primary image and the dark signal. The electronic image signal represents image information in the X-ray image and has not been disturbed by electric charges which have been read with a delay.

18 Claims, 2 Drawing Sheets

X-RAY EXAMINATION APPARATUS INCLUDING AN IMAGE SENSOR MATRIX WITH A CORRECTION UNIT

CROSS REFERENCE TO RELATED APPLICATIONS

This is a continuation of application Ser. No. 08/762,894, filed Dec. 10, 1996 now U.S. Pat. No. 6,028,913.

BACKGROUND OF THE INVENTION

1. Field of the Invention

The invention relates to an X-ray examination apparatus, including an image sensor matrix for picking up an X-ray image, and a correction unit for correcting disturbances in the primary image signal.

2. Description of the Related Art

An X-ray examination apparatus of this kind is known from European Patent Application EP 0 642 264, which corresponds to U.S. Pat. No. 5,530,238.

The known X-ray examination apparatus includes a correction unit for counteracting disturbances in the electronic image signal which are caused by delayed reading of charge. Incident X-rays release charge carriers, notably photoelectrons in the image sensor matrix and the X-ray image is thus picked up. A part of said photoelectrons can be intercepted in a trap state, be retained therein for some time, and can escape at a later stage, for example due to thermal excitation, and enter the reading circuit as electric charges read with a delay. If the primary image signal with the disturbances were applied to a monitor for displaying the image information, not only the image information of the instantaneous image would be reproduced, but at the same time also image information of a previously picked up image. As a result, the observer will perceive after-images superposed on the instantaneous image. The correction unit of the known X-ray examination apparatus utilizes a physical model for the interception and subsequent escape of the photoelectrons so as to correct disturbances due to electric charges read in delayed fashion. It is a drawback that the known X-ray examination apparatus requires a rather large image memory capacity for storing image information of a number of preceding images and/or for storing correction values for a long series of X-ray images as well as for different circumstances in which such X-ray images are formed. It is a further drawback that the correction unit of the known X-ray examination apparatus requires a powerful arithmetic unit for executing the desired correction on the basis of the image information stored. Because elaborate and complex operations are performed on a large number of data in the known X-ray examination apparatus, a rather long period of time is required to correct the primary image signal in respect of after-images. The long processing time prolongs the time elapsing between the picking up of the X-ray image and the reproduction of the image information in the X-ray image, for example on a monitor. Therefore, the known X-ray examination apparatus is not suitable for non-disturbed reproduction of the image information in an X-ray image quickly after it has been picked up. This concerns notably disturbances due to the superposition of image information of a previously picked up X-ray image on the image information to be reproduced, said superposed information being reproduced as an after-image together with the image to be reproduced. Consequently, the known X-ray examination apparatus is notably not suitable for reproducing a series of non-disturbed X-ray images in rapid succession.

SUMMARY OF THE INVENTION

It is an object of the invention to provide an X-ray examination apparatus which, in comparison with the known X-ray examination apparatus, requires only a short period of time for the correction of the primary image signal.

This object is achieved by means of an X-ray apparatus according to the invention which is characterized in that it includes a control circuit for controlling the image sensor matrix so as to form a dark signal, and that the correction unit is arranged to derive an electronic image signal from the primary image signal and the dark signal.

The x-ray examination apparatus comprises an X-ray source for emitting an X-ray beam in order to form the X-ray image of an object. The image sensor matrix further includes radiation-sensitive elements for converting X-rays into electric charges, and a reading circuit for deriving a primary image signal from the electric charges. The radiation-sensitive elements are, for example semiconductor elements, preferably made of $\alpha$-Si:H, in which electric charge carriers are released by absorption of X-rays, notably electron-hole pairs. Radiation-sensitive elements made of a photoconductor material sensitive to X-rays, such as selenium or lead-oxide, are also suitable. The individual radiation-sensitive elements may also include a photosensitive element, such as a photodiode or a phototransistor, in combination with a scintillator. The scintillator converts incident X-rays into longwave radiation, for example infrared or ultraviolet radiation or visible light. The longwave radiation is electromagnetic radiation of a wavelength which is substantially longer than that of X-rays. The construction of the scintillator is preferably chosen to be such that the sensitivity of the photosensitive elements to the longwave radiation is considerable and preferably as high as possible. The photosensitive element converts the long-wave radiation into electric charge. Use can also be made of a scintillator in the form of a scintillator layer which is common to a group of several photosensitive elements. Further details of an image sensor matrix suitable for picking up an X-ray image are disclosed in the European Patent Applications EP 0 440 282, EP 0 440 720, and French Patent Application FR 2 593 343.

The dark signal is formed by reading the image sensor matrix in the absence of incident X-rays. The signal level of the dark signal represents electric charges which have stayed behind in the radiation-sensitive elements, for example after a previous exposure, or charges which have been produced therein by thermal excitation. Correction of the primary image signal for disturbances caused by electric charge read with a delay is then comparatively accurately performed by subtracting the dark signal from the primary image signal. Correction is performed by deriving the electronic image signal from the dark signal and the primary image signal, which electronic image signal is substantially free from disturbances, notably disturbances due to electric charge read with a delay. The correction accuracy is higher as the period of time elapsing between the formation of the dark signal and the primary image signal is chosen to be shorter. The primary image signal is corrected not only in respect of electric charges read with a delay, but also in respect of dark current caused by thermal excitation. Moreover, the primary image signal is corrected in respect of perturbations that are caused by delayed release of longwave length radiation by the scintillator. Because correction requires only comparatively simple calculations which are executed on a comparatively limited number of data, only a short period of time is required to perform the correction of the primary image signal. Moreover, the correction requires neither a large storage capacity nor a complex arithmetic unit.

A preferred embodiment of an X-ray examination apparatus according to the invention is characterized in that the control circuit is arranged to control the image sensor matrix so as to form the dark signal prior to the X-ray pulse and to form the primary image signal after the X-ray pulse has ceased.

No X-rays are incident on the image sensor matrix just before the start of the X-ray pulse, so that it is achieved that the dark signal has a signal level which represents notably residual electric charge. Such a residual electric charge has been formed, for example during a previous X-ray pulse. It is notably if such a previous X-ray pulse had a high intensity and/or high energy that an electric charge will remain in the radiation-sensitive elements after the previous X-ray image formed by said previous X-ray pulse has been read from the image sensor matrix.

A further preferred embodiment of an X-ray examination apparatus according to the invention is characterized in that the control circuit is arranged to control the image sensor matrix so as to form dark signals separately prior to individual X-ray pulses and to form individual primary image signals after individual X-ray pulses have ceased, and that the correction unit is arranged to derive successive electronic image signals from an individual primary image signal and one or more dark signals. This embodiment achieves that a series of electronic image signals is provided at a comparatively high image rate. This series of electronic image signals represents image information of the series of X-ray images, the electronic image signals having been corrected notably in respect of electric charge read in a delayed fashion. It is thus achieved that the image information of the series of X-ray images can be reproduced without disturbing after-images. Moreover, such a series can be suitably reproduced at a high image rate, for example 30/s or even 60/s, substantially without disturbances.

A further preferred embodiment of an X-ray examination apparatus according to the invention is characterized in that the correction unit is arranged to combine two or more dark signals.

Even more accurate correction of the primary image signal or signals is achieved by combination of individual dark signals, without the processing speed being significantly degraded or the required amount of storage capacity being significantly increased. The combination of dark signals involves notably extrapolation of dark signals picked up at different instants prior to the reading of the electric charges so as to form the primary image signal. When a series of X-ray pulses is emitted, a dark signal is picked up preferably just before each of said X-ray pulses and extrapolation then implies linear combination of the individual dark signals. Suitable combination such as a running (i.e. reinporal) average enables formation of a correction signal which accurately corresponds to the electric charges read with a delay at the instant of reading of the image sensor matrix after the picking up of the X-ray image. The correction signal may be spatially low-pass filtered so as to reduce noise. The correction signal obtained by combination of dark signals is subtracted from the primary image signal to be corrected, thus forming the electronic image signal which is substantially free from disturbances, notably disturbances due to electric charges read with a delay.

The invention also relates to an X-ray examination apparatus, including an X-ray source for emitting an X-ray beam in order to form an X-ray image of an object, an image sensor matrix for picking up the X-ray image, which image sensor matrix includes radiation-sensitive elements for converting X-rays into electric charge, and a reading circuit for deriving a primary image signal from the electric charges. A preferred embodiment of such an X-ray examination apparatus according to the invention is characterized in that the reading circuit includes a first and a second reading section which are coupled to a first and a second group of radiation-sensitive elements, respectively.

Each group of radiation-sensitive elements comprises fewer radiation-sensitive elements than the image sensor matrix as a whole. The individual groups are read at least partly simultaneously by the individual reading sections. As a result, the time required for reading electric charge from all radiation-sensitive elements is less than if all radiation-sensitive elements were read by a single reading circuit. The reduction of the reading time is achieved by simultaneously reading as many radiation-sensitive elements as possible. As more separate reading sections are used, for example two, three or more, the reading time can be reduced further to approximately one half, one third or even a smaller part of the reading time required if a single reading circuit were used. As a result of the shorter reading time, for example approximately $1/60$ s or $1/30$ s, more images can be picked up per unit of time, so that changes occuring at a small time scale within the patient to be examined can be reproduced.

Furthermore, a reading circuit comprising a plurality of separate reading sections can be advantageously used in conjunction with correction for electric charges read with a delay. This is because the high reading speed, notably in combination with the short period of time required for the correction of the primary image signal, enables a dark signal to be picked up between two X-ray pulses, even if the X-ray pulses succeed one another in rapid succession, for example with an interval of only approximately $1/30$ s or $1/15$ s between the X-ray pulses. The high reading speed enables correction of successive primary image signals by means of one or more dark signals at a high image rate. This enables reproduction of the image information of X-ray images in rapid succession, without disturbances; notably after-images are counteracted, a high image rate nevertheless being maintained during reproduction. The high reading speed also offers the advantage that the image sensor matrix can be read once additionally between two successive X-ray pulses. Residual charges in the image sensor matrix are thus reduced before a next X-ray image is picked up and read. Operations for correcting the primary image signal can then even be omitted, so that no time is spent thereon.

The invention also relates to an X-ray examination system which includes a first and a second X-ray source for emitting separate X-ray beams in different directions so as to form individual X-ray images of an object, and also a first and a second image sensor matrix for picking up the individual X-ray images, which image sensor matrices include radiation-sensitive elements for converting X-rays into electric charges, and a reading circuit for deriving a primary image signal from the electric charges.

An x-ray examination system according to the invention comprises an X-ray examination apparatus, in particular as claimed in one of the preceding claims, including an X-ray source for emitting an X-ray beam in order to form an X-ray image of an object, an image sensor matrix for picking up the X-ray image, which image sensor matrix includes radiation-sensitive elements for converting X-rays into electric charges, a reading circuit for deriving a primary image signal from the electric charges, characterized in that the reading circuit includes a first and a second reading section which are coupled to a first and a second group of radiation-sensitive elements, respectively. A preferred embodiment of such an X-ray examination system according to the invention is characterized in that it includes a control circuit for controlling one or both image sensor matrices so as to form a dark signal, and also a correction unit for deriving an electronic image signal from the primary image signal of one of the image sensor matrices and the dark signal.

An X-ray examination system of this kind is suitable notably for cardiovascular diagnostic examinations. During such an examination the cardiac region of the patient to be examined is imaged from different projections. During operation of the X-ray examination system, respective X-ray sources and respective image sensor matrices are arranged so as to face one another. Preferably, the individual X-ray images are formed in rapid succession. The respective image sensor matrices pick up X-ray images corresponding to the respective projections. Moreover, the patient scatters radiation during irradiation by one of the X-ray beams. During irradiation of the patient by one X-ray beam from one X-ray source in one direction, the patient will emit fluorescent X-rays in various directions. A part of the fluorescent and scattered X-rays will be received by the image sensor matrix arranged opposite the other X-ray source. Crosstalk thus arises between the primary image signal of the individual image sensor matrices. The dark signal represents electric charge released by fluorescent and/or scattered X-rays in the radiation-sensitive elements. This electric charge represents no or hardly any image information. The correction unit corrects disturbances caused in the primary image signal by fluorescent and/or scattered X-rays. Preferably, the X-ray system includes one or more image sensor matrices with a reading circuit including a plurality of reading sections. This enables electronic image signals to be formed at a high image rate so as to reproduce image information of X-ray images relating to different projection directions. Disturbances due to crosstalk between the individual image sensor matrices and due to electric charges read with a delay are then reduced, it nevertheless being possible to maintain a high image rate during reproduction.

The following advantage is obtained when in an X-ray examination apparatus use is made of image sensor matrices with a multiple reading circuit. While one image sensor matrix picks up and subsequently reads an X-ray image, the second image sensor matrix receives scattered and fluorescent X-rays and the charges generated by said X-rays are at least partly read. When subsequently an X-ray image is picked up by the second image sensor matrix, disturbances due to charges read with a delay have been substantially reduced because a substantial part of these charges was read before the second image sensor matrix started to pick up an image. Because the multiple reading circuit achieves such a high reading speed for the image sensor matrices together, X-ray images can be picked up at a high image rate while therebetween undesirable charges due to fluorescent and scattered X-rays can still be removed from the image sensor matrices. Such an embodiment does not require a correction unit for correcting the primary image signal, because the primary image signal does not contain an excessive amount of disturbances. Such removal can be achieved, for example by dissipating the relevant charges to ground.

These and other aspects of the invention will be apparent from and elucidated with reference to the embodiments described hereinafter.

DETAILED DESCRIPTION OF THE PREFERRED EMBODIMENTS

Figure 1:
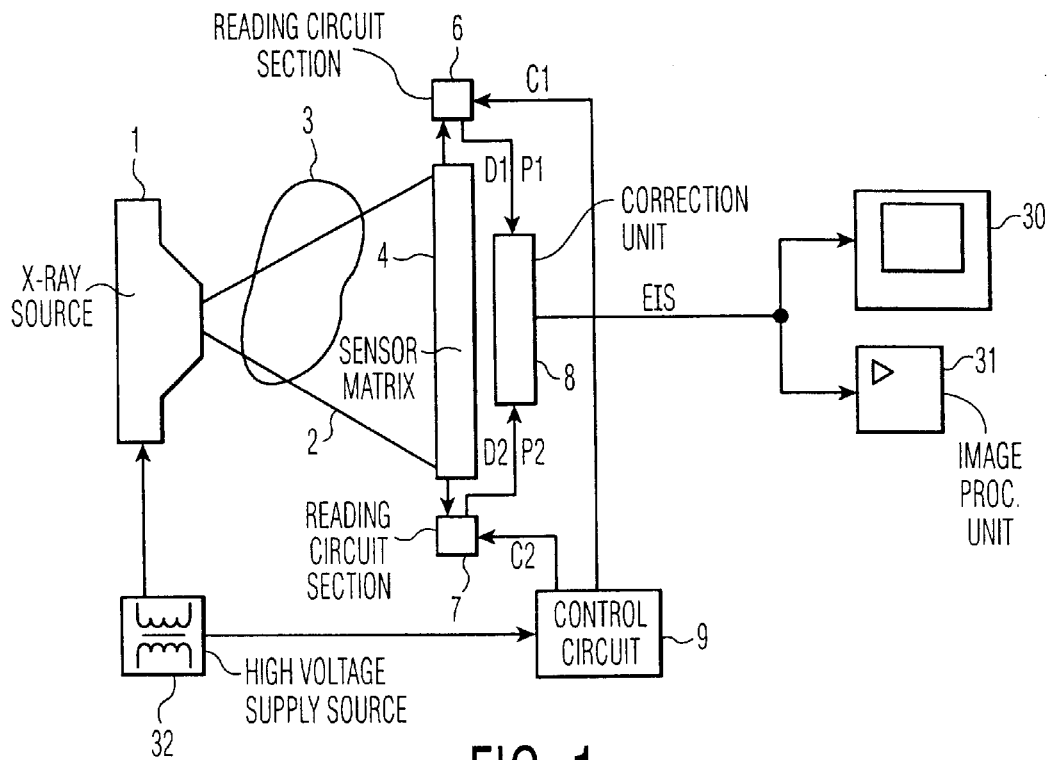
FIG. 1 shows diagrammatically an X-ray examination apparatus in which the invention is used.

FIG. 1 shows diagrammatically an X-ray examination apparatus in which the invention is used. The X-ray source 1 irradiates an object 3, for example a patient to be examined, by means of a series of X-ray pulses. During each of these X-ray pulses, the object is briefly irradiated by an X-ray beam 2. Due to local differences in the X-ray absorption within the object, an image sensor matrix 4 constituting an X-ray image is formed on an X-ray detector which forms an electronic image signal EIS from the X-ray image. The electronic image signal EIS is applied to a monitor 30 on which the image information in the X-ray image is reproduced. The electronic image signal EIS may also be applied to an image processing unit 31 for further processing. When a series of successive X-ray pulses is emitted, a corresponding series of X-ray images is formed, the image information contained therein then being reproduced on a monitor as a series of images.

Image sensor matrix includes radiation-sensitive elements in which incident X-rays generate electric charges. The electric charge is read by means of a reading circuit 6, 7. The reading circuit of the present embodiment comprises two separate reading sections, each of which is coupled to individual groups of radiation-sensitive elements. Each of the individual reading sections supplies a primary image signal $P_1$, $P_2$. The individual primary image signals $P_1$, $P_2$ represent the respective parts of the X-ray image picked up by the respective groups of radiation-sensitive elements. The control circuit 9 is coupled to the reading circuit. The control circuit ensures that the reading circuit reads the image sensor matrix before an X-ray pulse is emitted. The electric charges then read are converted into dark signals $D_1$, $D_2$ by the reading circuit 6, 7. The primary image signals $P_1$, $P_2$ and the dark signals $D_1$, $D_2$ are applied to the correction unit 8. The correction unit 8 subtracts the dark signal $D_1$ from the primary image signal $P_1$ and the dark signal $D_2$ from the primary image signal $P_2$. The difference signals thus obtained are substantially free from disturbances due to the delayed reading of electric charges which have stayed behind in the image sensor matrix, notably in the radiation-sensitive elements, after a previous X-ray pulse. The difference signals, relating to separate parts of the X-ray image, are combined so as to form the electronic image signal EIS which represents brightness values of the complete X-ray image.

The control circuit 9 is coupled to a high voltage supply source 32 of the X-ray source in order to ensure that prior to an individual X-ray pulse the reading circuit is activated so as to deliver one or more dark signals, and that after the relevant X-ray pulse one or more primary image signals are delivered. Preferably, the correction unit 8 includes a memory unit or a delay unit to ensure that corresponding signal levels of primary image signals and dark signals are subtracted from one another.

Figure 2:
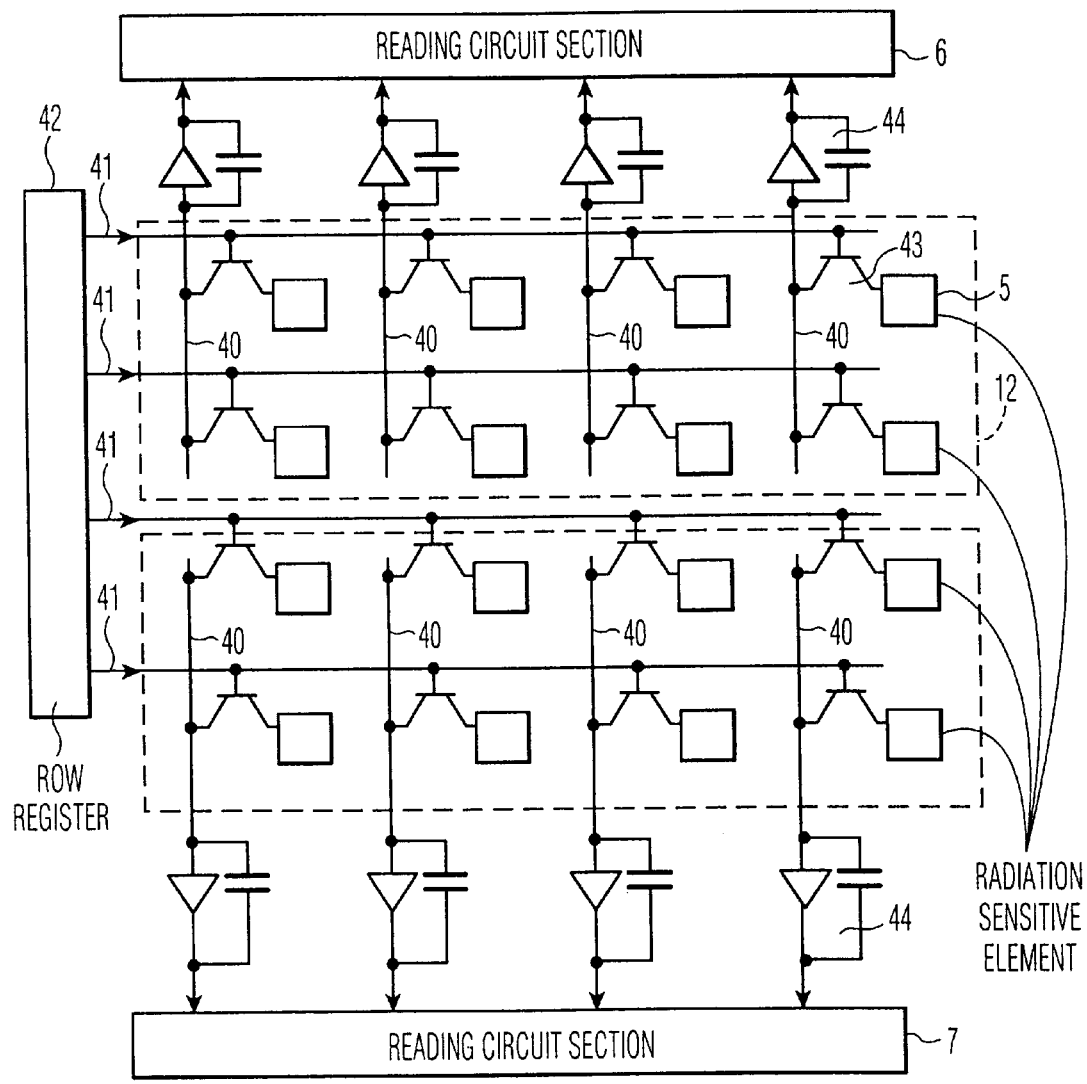
FIG. 2 is a diagrammatic plan view of an image sensor matrix forming part of the X-ray examination apparatus of FIG. 1.

FIG. 2 is a diagrammatic plan view of an image sensor matrix which forms part of the X-ray examination apparatus of FIG. 1. For the sake of simplicity of the figure, an image sensor matrix is shown which includes 4×4 radiation-sensitive elements 5 by way of example. In practice a much larger number of radiation-sensitive elements may be used, for example 1000×1000, and the surface area of the image sensor matrix amounts to, for example a few square decimeters. The thickness of the image sensor matrix may also amount to no more than one or a few centimeters. Such an image sensor matrix enables a complete thorax image to be picked up with a high spatial resolution during one exposure. The cross-section of a single radiation-sensitive element 5 typically amounts to 200 μm×200 μm. The image sensor matrix includes two groups 12, 13 of radiation-sensitive elements. In each group the radiation-sensitive elements are coupled column-by-column to read lines 40 of the respective reading circuit sections 6, 7. The radiation-sensitive elements 5 are coupled to address lines 41 row-by-row. Individual radiation-sensitive elements are coupled to their address and read line via switching elements 43 which are preferably thin-film transistors. Each of the transistors is coupled to the relevant read line by way of a drain contact; it is coupled to the relevant radiation-sensitive element by way of its source contact and to the relevant address line by way of its gate contact. A row register 42 supplies the address lines with address signals which are applied to the gate contacts of the transistors 43 in the relevant row so as to turn on these transistors. Electric charge in the radiation-sensitive elements is transferred, via the read lines, to integrating amplifiers 44 provided per column and per group. Thus, complete rows of radiation-sensitive elements of the image sensor matrix are read approximately simultaneously. The integrating amplifiers 44 derive voltages from the electric charges, which voltages are applied to the reading sections 6 and 7. The reading sections 6 and 7 together constitute the reading circuit. The reading sections 6, 7 are constructed, for example, by means of multiplexers. Because electric charges are transferred from individual groups of radiation-sensitive elements to individual reading sections, more radiation-sensitive elements can be read simultaneously or in parallel in the same column, and hence the time required for reading the complete image sensor matrix is reduced. The more reading sections are used, the more rows can be simultaneously read. When two reading sections are used, a 1000×1000 matrix can be read within 1/60 s.

Figure 3:
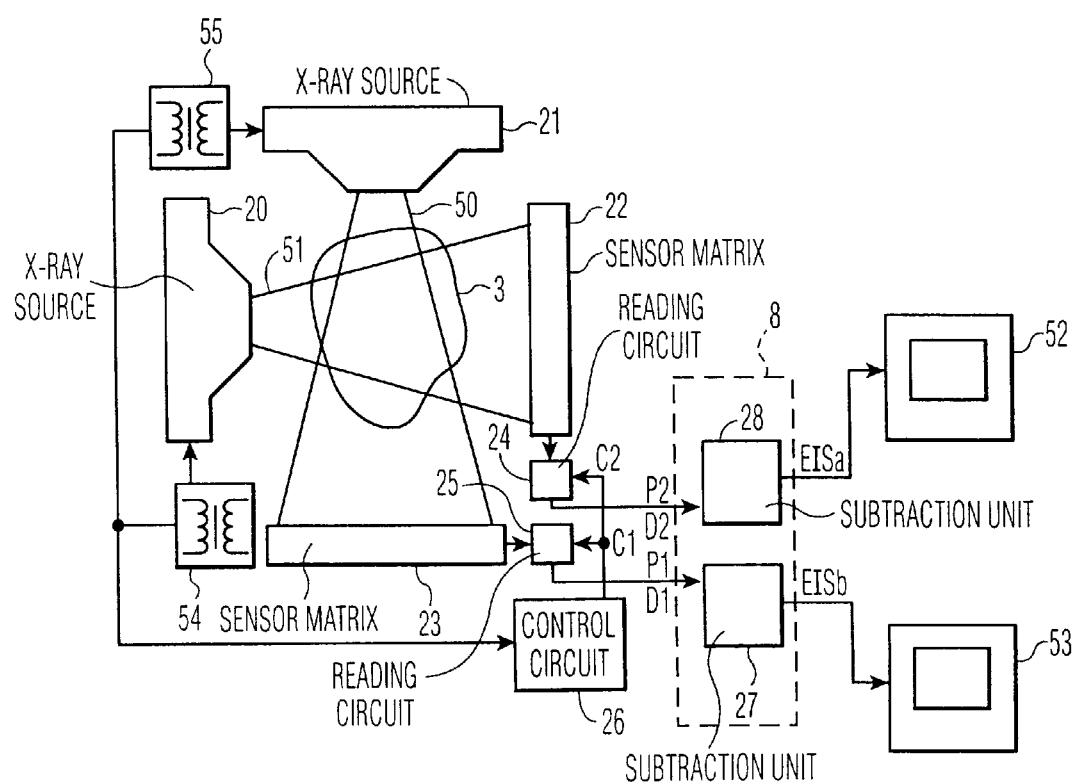
FIG. 3 shows diagrammatically an X-ray examination system in which the invention is used.

FIG. 3 shows diagrammatically an X-ray examination system in which the invention is used. Therein an object is irradiated by means of individual X-ray beams or pulses 50, 51 which are emitted in different directions by individual X-ray sources 20, 21. As a result, separate X-ray images are formed which correspond to projections from different directions of the patient to be examined. The respective X-ray images are picked up by means of individual image sensor matrices 22, 23. Each of the image sensor matrices includes a reading circuit 24, 25 which itself may be subdivided into two or more reading sections as described with reference to FIG. 2. The control circuit 26 supplies control signals $C_1$, $C_2$ for controlling the reading circuits 24, 25 so as to pick up dark signals $D_1$, $D_2$. Preferably, a dark signal $D_1$ is picked up from one image sensor matrix, for example the image sensor matrix 23, just before the X-ray source 21 emits an X-ray pulse and after expiration of an X-ray pulse emitted by the X-ray source 20 arranged opposite the other image sensor matrix 22. The dark signal $D_1$ represents electric charges generated by radiation intensity due to X-ray scattering and/or fluorescence due to the X-ray pulse just ceased. After the X-ray pulse from the X-ray source 21, the control circuit ensures that the image sensor matrix 23 reads the primary image signal $P_1$. Subtraction of the dark signal $D_1$ from the primary image signal $P_1$ in the subtraction unit 27 produces the electronic image signal $EIS_b$ which represents brightness values in the X-ray image on the image sensor matrix 23 and in which hardly any crosstalk occurs with X-ray pulses from the X-ray source 20. Analogously, the control circuit 26 reads a dark signal $D_2$ from the image sensor matrix 22 for correction of the primary image signal from the image sensor matrix 22 in respect of crosstalk with X-ray pulses from the X-ray source 20. This correction is performed by the subtraction unit 28 which subtracts the signals $P_2$ and $D_2$. The two subtraction units 27, 28 constitute the correction unit 8 in the present embodiment. In practice it appears that subtraction of the dark signals from the primary image signals can be omitted. Preferably the image sensor is read-out just before the x-ray pulse to form the dark signal. As a consequence most of the delayed changes are removed in that the primary image signal which is formed just after read-out of the dark signal contains almost no disturbances. The individual image signals $EIS_a$, and $EIS_b$, representing the information of the individual X-ray images, are applied to separate monitors 52, 53. On these monitors the projections in different directions of the patient to be examined are displayed as defined by the directions in which the X-ray sources emit X-ray pulses. The control circuit 26 is coupled to the high voltage power supply sources 54, 55 of the individual X-ray sources 20, 21 for suitable synchronization of the reading of dark signals and primary image signals with the X-ray pulses from the individual X-ray sources.

All references cited herein are incorporated herein by reference in their entirety and for all purposes to the same extent as if each individual publication or patent or patent application was specifically and individually indicated to be incorporated by reference in its entirety for all purposes.

What is claimed is:

1. An x-ray examination apparatus comprising:
   an x-ray source for emitting x-ray pulses to form x-ray images of an object to be examined,
   an image sensor matrix for generating primary image signals from x-ray images and for generating dark signals in the absence of x-ray images during examination of said object, and
   a control circuit arranged
      to control the x-ray source to emit a series of x-ray pulses to form a series of x-ray images during examination of said object,
      to control the image sensor matrix to generate one or more dark signals prior to acquisition of each x-ray image and to generate one or more primary image signals from each said x-ray image, and that a series of dark signals and a series of primary image signals are processed to generate successive corrected electronic image signals.

2. The apparatus of claim 1 wherein the control circuit is further arranged to generate at least fifteen primary image signals per second.

3. The apparatus of claim 1 further comprising a correction unit for deriving corrected image signals from primary image signals and dark signals, and wherein the control circuit is further arranged to control the correction unit to derive a corrected image signal from a primary image signal and from one or more dark signals generated prior to the primary image signal, whereby a series of corrected image signals is formed.

4. The apparatus of claim 3 wherein the correction unit is arranged to combine two or more dark signals in order to derive a corrected image signal from a primary image signal.

5. The apparatus of claim 4 wherein the two or more dark signals are combined by temporally extrapolating from the two or more dark signals an extrapolated dark signal that is predicted to be generated by the image sensor matrix at the time of generating the primary image signal.

6. The apparatus of claim 1 wherein the image sensor matrix further comprises:
- a plurality of x-radiation-sensitive semiconductor elements for converting x-rays into electric charges, and
- a reading circuit for generating the primary image signal from the electric charges, wherein the reading circuit includes a plurality of reading sections which are coupled to a plurality of separate groups of the plurality of x-radiation-sensitive elements.

7. The apparatus of claim 6 wherein the plurality of x-radiation-sensitive semiconductor elements comprise α-Si:H.

8. The apparatus of claim 1 wherein the image sensor matrix further comprises:
- a plurality of radiation-sensitive elements for converting x-rays into electric charges, wherein the radiation sensitive element comprises a separate photosensitive element and a scintillator, and
- a reading circuit for generating the primary image signal from the electric charges, wherein the reading circuit includes a plurality of reading sections which are coupled to a plurality of separate groups of the plurality of radiation-sensitive elements.

9. The apparatus of claim 1 wherein the image sensor matrix further comprises:
- a plurality of x-radiation-sensitive photoconductor elements with an x-ray-sensitivity conductivity, and
- a reading circuit for generating the primary image signal from the conductivity of the photoconductor elements, wherein the reading circuit includes a plurality of reading sections which are coupled to a plurality of separate groups of the plurality of x-radiation-sensitive elements.

10. An x-ray examination apparatus comprising:
- a first and a second x-ray source for emitting x-ray pulses in different directions to form x-ray images of an object to be examined,
- a first and a second image sensor matrix for generating primary image signals from x-ray images formed by the first and the second x-ray sources, respectively, and for generating dark signals in the absence of x-ray images, and
- a control circuit arranged
  - to control the first and second x-ray sources to emit x-ray pulses,
  - to control the first image sensor matrix to generate one or more dark signals after an x-ray pulse emitted by the second x-ray source, to generate one or more dark signals prior to an x-ray pulse emitted by the first x-ray source, and to generate one or more primary image signals from an x-ray image formed by the first x-ray source, and
  - to control the second image sensor matrix to generate one or more dark signals after an x-ray pulse emitted by the first x-ray source, to generate one or more dark signals prior to an x-ray pulse emitted by the second x-ray source, and to generate one or more primary image signals from an x-ray image formed by the second x-ray source,
- whereby crosstalk between the first and second x-ray sources is reduced.

11. The apparatus of claim 10 further comprising a correction unit for generating corrected image signals from the primary image signals and the dark signals generated by the first and the second image sensor matrices, respectively, and wherein the control circuit is further arranged to control the correction unit to derive corrected image signals from primary image signals and from one or more dark signals generated prior to the primary image signals.

12. The apparatus of claim 10 wherein at least one of the first and the second image sensor matrices comprises
- a plurality of x-radiation-sensitive semiconductor elements for converting x-rays into electric charges, and
- a reading circuit for generating the primary image signal from the electric charges, wherein the reading circuit includes a plurality of reading sections which are coupled to a plurality of separate groups of the plurality of x-radiation-sensitive elements.

13. The apparatus of claim 12 wherein the plurality of x-radiation-sensitive semiconductor elements comprise α-Si:H.

14. The apparatus of claim 10 wherein the image sensor matrix comprises
- a plurality of radiation-sensitive elements for converting x-rays into electric charges, wherein the radiation sensitive element comprises a separate photosensitive element and a scintillator, and
- a reading circuit for generating the primary image signal from the electric charges, wherein the reading circuit includes a plurality of reading sections which are coupled to a plurality of separate groups of the plurality of radiation-sensitive elements.

15. The apparatus of claim 10 wherein at least one of the first and the second image sensor matrices comprises
- a plurality of x-radiation-sensitive photoconductor elements with an x-ray-sensitivity conductivity, and
- a reading circuit for generating the primary image signal from the conductivity of the photoconductor elements, wherein the reading circuit includes a plurality of reading sections which are coupled to a plurality of separate groups of the plurality of x-radiation-sensitive elements.

16. An x-ray examination apparatus comprising:
- an x-ray source for emitting x-ray pulses to form x-ray images of an object to be examined,
- an image sensor matrix for generating primary image signals from x-ray images and for generating dark signals in the absence of x-ray images during examination of said object, wherein the image sensor matrix further comprises
  - a plurality of x-radiation-sensitive semiconductor elements for converting x-rays into electric charges, and
  - a reading circuit for generating the primary image signal from the electric charges, and
- a control circuit arranged
  - to control the x-ray source to emit x-ray pulses to form x-ray images,
  - to control the image sensor matrix to generate one or more dark signals prior to each x-ray image and to generate one or more primary image signals from each x-ray image, and for correcting each of said one or more primary image signals to generate one or more corrected electronic image signals using said one or more dark signals.

17. The apparatus of claim 16 wherein the plurality of x-radiation-sensitive semiconductor elements comprise α-Si:H.

18. The apparatus of claim 16 wherein the reading circuit further comprises a plurality of reading sections which are coupled to a plurality of separate groups of the plurality of x-radiation-sensitive elements.

* * * * *